US 6,674,821 B1

(12) United States Patent
Mejyr (10) Patent No.: US 6,674,821 B1
(45) Date of Patent: Jan. 6, 2004

(54) METHOD AND APPARATUS FOR REDUCING POWER CONSUMPTION

(75) Inventor: Sven Mejyr, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/473,614

(22) Filed: Dec. 29, 1999

(30) Foreign Application Priority Data

Dec. 30, 1998 (SE) ............................................. 9804607

(51) Int. Cl.⁷ ................................................. H04L 7/00
(52) U.S. Cl. ...................................................... 375/354
(58) Field of Search ................................ 375/354, 355; 370/350, 503; 327/40, 43; 455/574

(56) References Cited

U.S. PATENT DOCUMENTS 5,122,800 A  *  6/1992  Philipp ........................ 341/156
5,455,923 A     10/1995  Kaplinsky
5,589,763 A  * 12/1996  Burns ....................... 324/76.15
5,677,849 A     10/1997  Smith

FOREIGN PATENT DOCUMENTS

JP           7-244650         9/1995

* cited by examiner

Primary Examiner—Khai Tran
(74) Attorney, Agent, or Firm—Burns, Doane, Swecker & Mathis, L.L.P.

(57) ABSTRACT

An arrangement for clock control in a device receiving a clock from an external source includes a switching device for switching an external clock through to the device as an internal clock, and clock request generation devices, adapted to switch clock signals through to the external clock controller as requests for suppressing and restarting the external clock. Control devices are provided in the form of a state machine to control the generation of the internal clock through the switching device and to control the clock request generation device in accordance with a predetermined state of two signals, one generated internally by the device, the other by the external clock controller. The clock request generation devices are also coupled to a clock start module adapted to receive several input signals for signaling an event requiring the clocked operation of the device.

23 Claims, 5 Drawing Sheets

| Current State | Input Signals | | | | Output Signals | |
|---|---|---|---|---|---|---|
| | c=0, a=0 | c=0, a=1 | c=1, a=0 | c=1, a=1 | x | y |
| 0 | 0 | 1 | 1 | 0 | 1 | 1 |
| 1 | 1 | 1 | 2 | 2 | 0 | 0 |
| 2 | 2 | 3 | 3 | 2 | 0 | 1 |
| 3 | 0 | 3 | 3 | 3 | 1 | 1 |
| | Next State | | | | | |

METHOD AND APPARATUS FOR REDUCING POWER CONSUMPTION

BACKGROUND

The present invention relates to a method and apparatus for disabling and restarting a clock in a device. The invention is particularly directed to devices requiring the suppression of clock generation in periods of inactivity to reduce power consumption, such as battery powered devices.

In battery powered products, such as mobile phones or portable personal computers, it is important to save power in order to prolong the lifetime of the batteries. One way of reducing power is to switch off clocks to processors in periods of inactivity. However, in products wherein synchronised operation with an external device is required, such as mobile phones which must be synchronised with a network, for example, at least one clock must be running constantly to provide this synchronisation. In products incorporating several processors, one processor is generally designated as a master processor to one or several slave processors in the product, and will control the switching on and off of clock signals to these slave processors when required. However, in order to restart a clock, the master processor must be aware of any event, such as the pressing of a key on a mobile phone, which requires the synchronised operation of a slave processor, and therefore the supply of the clock signal, to be restarted.

In a clock control arrangement described in JP 7-244650 an external clock source is provided to a digital signal processor of a digital radio terminal. The arrangement generates an internal clock from the external clock signal, but supply of the external clock may be suppressed in periods of inactivity to save power. This is managed using a clock control signal emitted by the clock control arrangement. While this signal is high, the external clock signal is supplied to the processor. When a low power mode, or sleep mode, is set by software, the clock request signal emitted by the clock control arrangement is forced low. The supply of the external clock is then suppressed and the internal clock halted. When an interruption request, indicating the need for a clock signal, is received by the clock control arrangement, the clock request signal is set high, whereupon the internal clock is enabled and the external clock is supplied again.

A problem with this arrangement is that the arrival of an asynchronous interrupt at the moment of suppressing the external clock may cause the internal clock to toggle and possibly cause the processor circuitry to enter a prohibited state. Furthermore, the state of the restarted internal clock is uncertain since it is dependent on the retransmission of the external clock in response to an asynchronous request. A further drawback of the described arrangement is that the clock control device can deal with only one interrupt, which severely limits its applications.

SUMMARY

It is therefore an object of the present invention to provide a method and apparatus for clock control, which overcomes the problems associated with the prior art.

It is a specific object of the present invention to provide a method and apparatus for clock control which enables an internal clock signal to be stopped reliably and cleanly and also to be restarted reliably and cleanly in response to an asynchronous event.

These and further objects are achieved in an apparatus for controlling a clock having switching means for switching an external clock through to the device as an internal clock, and clock request generation means, adapted to transmit request signals to an external clock controller. These signals serve as requests to suppress and restart the external clock. Control means are provided to control the generation of the internal clock through the switching means and the clock request generation means in accordance with the predetermined state of at least one control signal. The clock request generation means are also coupled to a clock start module adapted to receive several input signals that may signal an event requiring the clocked operation of the device. Preferably, the control means control clock suppression and restarting using two signals, one originating in the device, the other in the clock control means. On entering a low power mode, the internal clock is first disabled, then a request for suppression of the external clock sent. This provides the conditions for the external clock to be disabled, unless one of the input signals changes state, which effectively causes the request to be suppressed. The external clock thus remains in operation, so allowing the internal clock to be restarted cleanly.

With this apparatus, the control of the internal clock may be separate from, and independent of, any request to stop or restart the external clock. Hence the internal clock can be cleanly and reliably stopped and restarted under control of the external clock, even in the event of an asynchronous request for clocked operation. Furthermore, a clock request signal resulting from a change of state of any input signal can be controlled by the arrangement such that it prevents the suppression of the external clock or initiates the restarting of the external clock as appropriate. A single request signal may be generated from any of several input signals, while the use of one or only two signals to control the external clock means that, at most, only two connections need be provided between the device and the external clock controller for controlling clock generation, irrespective of the number of input signals.

BRIEF DESCRIPTION OF THE DRAWINGS

Further objects and advantages of the present invention will become apparent from the following description of the preferred embodiments that are given by way of example with reference to the accompanying drawings, in which.

DETAILED DESCRIPTION OF THE DRAWINGS

Figure 1:
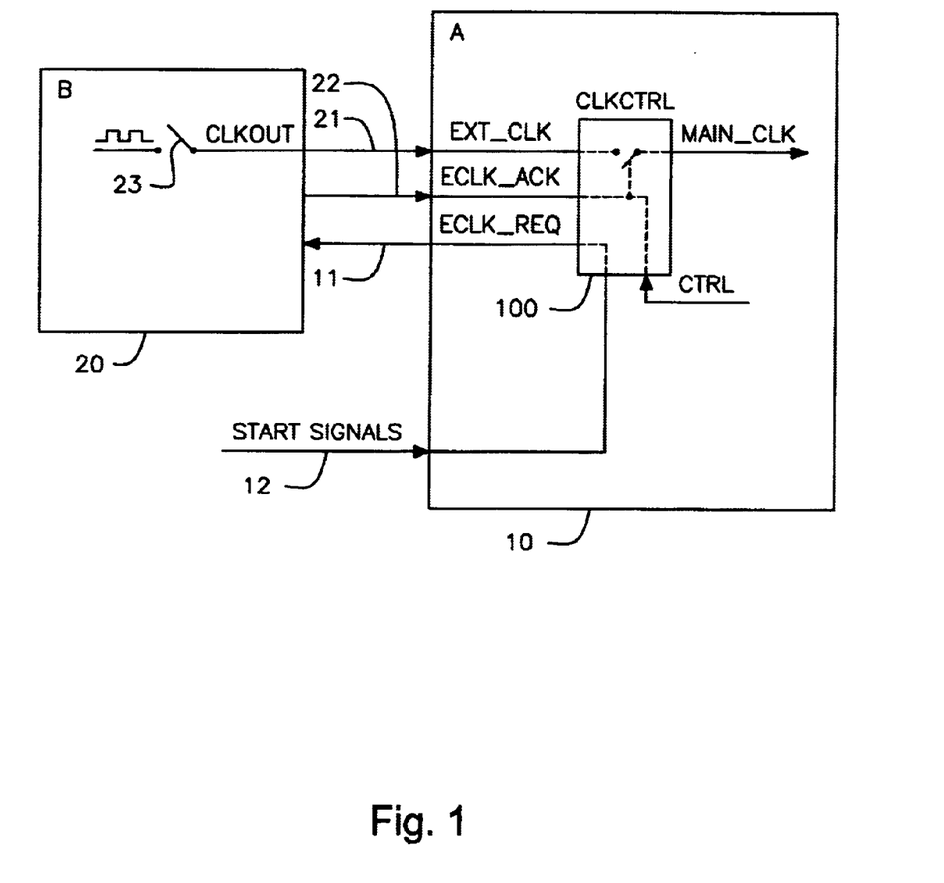
FIG. 1 schematically illustrates a circuit overview of a slave and master device with a clock control block arranged in the slave device, FIG. 2 schematically shows a detailed circuit of the clock control block.

FIG. 1 shows two processors, processor A 10 and processor B 20. Processor A 10 receives a clock signal EXT_CLK from processor B via a terminal 21, and uses this signal to generate an internal clock MAIN_CLK. It is assumed for the present embodiment that processor A 10 and processor B 20 are comprised in separate devices in a mobile phone. The signal EXT_CLK is generated from an internal clock within processor B 20. The internal clock for processor B will be generated continuously to maintain synchronisation with the network.

During periods of inactivity, the internal clock MAIN_CLK of processor A 10 can be disabled to save power. Thus during these periods, processor A 10 does not need to receive the external clock signal EXT_CLK from processor B 20. To this end processor B 20 includes an suitable switch, represented in the figure by an open switch symbol 23, for interrupting transmission of the clock signal ETX_CLK.

A number of clock start signals, represented in the figure by a single line 12, arrive at processor A 10. These input signals may include any signal indicating that synchronised activity is required in processor A. For example, in a mobile phone they could be the result of a key being pressed or a flip lid being opened. Processor A 10 is also connected by two terminals 22, 11 with processor B 20. The exchange of signals across these two connections is utilised to inform processor B 20 that a clock signal can be disabled and also that the clock signal should be restarted. These signals will be described in more detail below.

The disabling and restarting of the internal MAIN_CLK and external EXT_CLK clock signals is controlled in processor A 10 by a clock control block 100. The remaining portions of processor A are omitted in the figure for clarity. This control block 100 receives the clock start signals 12 and the external clock ETX_CLK 21 and generates the internal clock MAIN_CLK, which is sent to the core of processor A 10 for synchronising operation. The control block 100 is also connected to processor B 20 via the two terminals 21, 22. Specifically, the control block 100 sends a clock request signal ECLK_REQ to processor B 20 and receives a clock acknowledgement signal ECLK_ACK from processor B 20.

Figure 2:
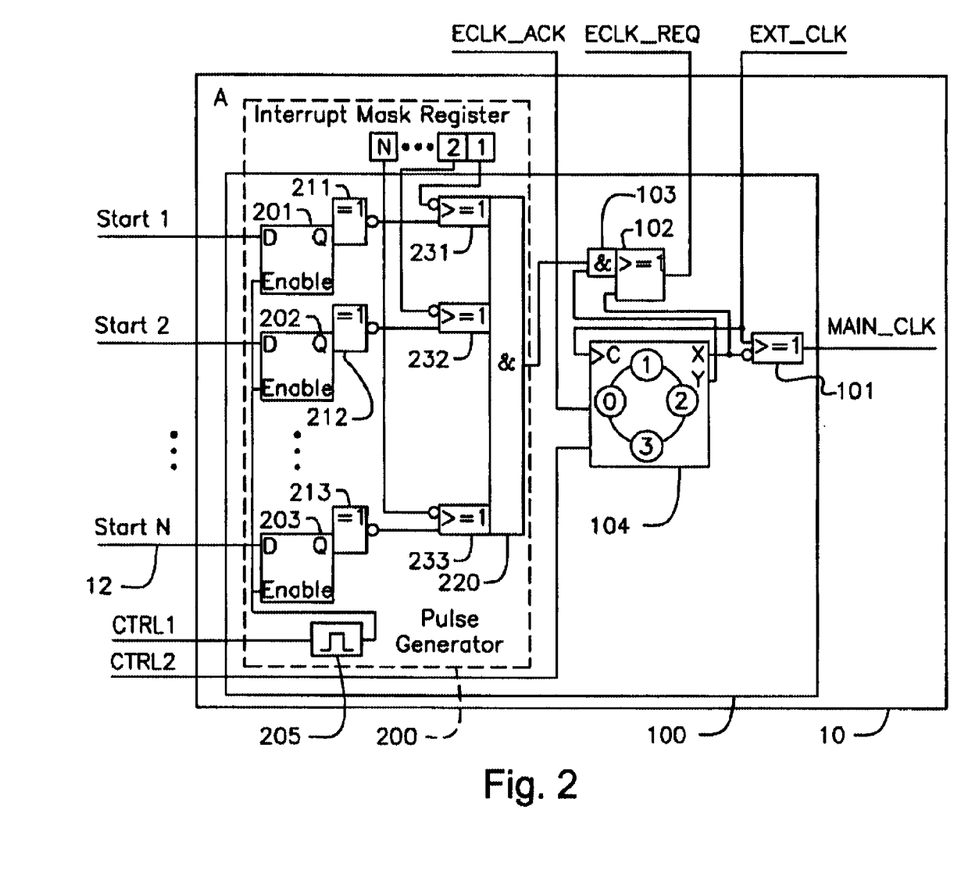

FIG. 2 shows the structure of the clock control block 100 in more detail. The clock start signals 12, denoted in FIG. 2 by signals Start 1 to Start N, are received by a clock request module 200 within the control block 100. Each start signal Start 1 to Start N is coupled to the input of a latch 201, 202, 203. These latches may be constituted by transparent latches, D-type flip-flops, or any suitable circuitry that enables the storage of the input states for an indeterminate length of time. The start signals 12 are also each coupled to an input of an Exclusive-OR gate (XOR) with inverted output 211, 212, 213. The other input of each XOR-gate is connected to the Q output of the corresponding latch 201, 202, 203. The enable inputs of the latches 201, 202, 203, are connected in parallel to the output of a pulse generator 205. The pulse generator 205 is controlled by a control signal CTRL1 that is generated by processor A 10. This control signal CTRL1 will typically be generated by software when processor A has established that no activity requiring a clock signal is being performed, and initiates the procedure for disabling the clock. It may be a value written into a register in processor A 10, e.g. a clock control register (not shown), or be generated on a separate and dedicated connection. When a pulse is generated by the generator 205, the current state of the clock start inputs 12 will be latched into the flip flops. Hence the outputs of all inverted output XOR-gates 211, 212, 213 will be high until any of the clock start inputs changes state.

The outputs of the XOR-gates 211, 212, 213 are each connected to an input of a respective OR-gate 231, 232, 233. A second, inverted, input of each OR-gate is connected to a specified cell of a mask register 240. The output of each OR-gate 231, 232, 233 is connected to the input of a single AND-gate 220. In FIG. 2, the mask register 220 is located outside the clock control module 100 but within processor A 10. However, it will be understood that this register may also be incorporated in the clock control module 100. Each cell in the mask register 240 is programmed with either a '1' or a '0', depending on whether the associated clock start input is authorised to generate a clock request signal or not. When the signal is masked, i.e. when a '0' is present in the associated register cell, a change of state of the input signal, resulting in a high at the output of the XOR-gate 211, 212, 213, will not affect the output of the corresponding OR-gate 23, 232, 233, and hence will not change the output of the AND-gate 220. However, the change of state of any unmasked signal will cause the output of the AND-gate to go low.

The output of the clock request module 200, that is, the output of the AND-gate 220, is connected to an input of a further AND-gate 103. The output of this AND-gate 103 is connected to an input of an OR-gate 102. The output of this OR-gate is connected to a terminal 11 of processor A adapted to be connected to processor B. The other input of the OR-gate 102 is connected to a first output 'x' of a state machine 104. The second input of the AND-gate 103 is connected to a second output 'y' of the state machine 104. The first output x of the state machine 104 is also connected to the inverted input of an OR-gate 101. The other input of this OR-gate 101 receives the external clock signal ETX_CLK from a further terminal 21 of processor A. The OR-gate 101 generates an internal clock signal MAIN_CLK for processor A when enabled by the state machine output x. The external clock signal ETX_CLK is also connected to the clock input of the state machine 104. Finally the state machine receives two input signals: a first control signal CTRL2 which is generated by processor A, and a second control signal, or acknowledgement signal ECLK_ACK, received through a third terminal 22 of processor A 10 from processor B 20. As for the control signal CTRL 1, the first control signal CTRL2 may be a value written to a clock control register (not shown) in processor A.

Figure 3:
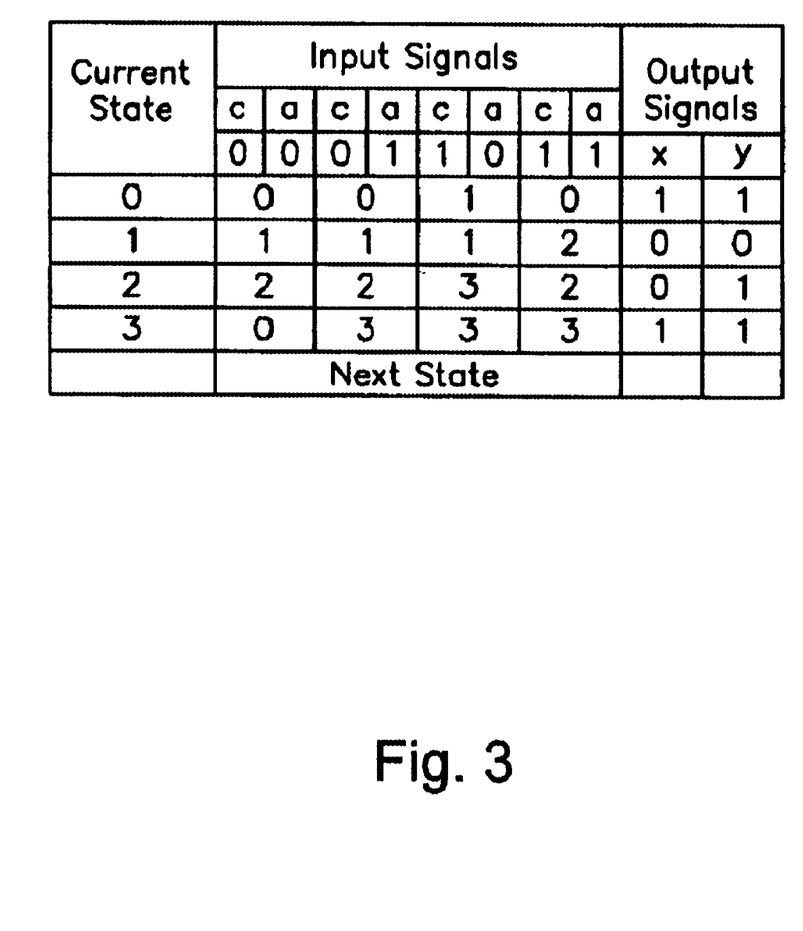
FIG. 3 shows a truth table for a state machine in the clock control block.

The truth table of the state machine 104 showing the states defined by the inputs and the corresponding levels of the outputs x and y is given in FIG. 3. In this table, input 'c' denotes the signal CTRL2 and the input 'a' denotes the signal ECLK_ACK. With reference to this truth table and the timing diagrams in FIGS. 4 and 5, the operation of the clock control block, processor A and processor B to stop and restart the clock will now be described.

Initially, both inputs to the state machine 104, CTRL2 and ECLK_ACK, are low. The state machine 104 is thus by default in state 0. In this state, outputs x and y are high, so that the generation of the internal clock MAIN_CLK through the OR-gate 101 is enabled, and the generation of a clock request signal, i.e. pulling ECLK_REQ low, is inhibited by holding one input of each of the AND- and OR-gates 102, 103 high.

Figure 4:
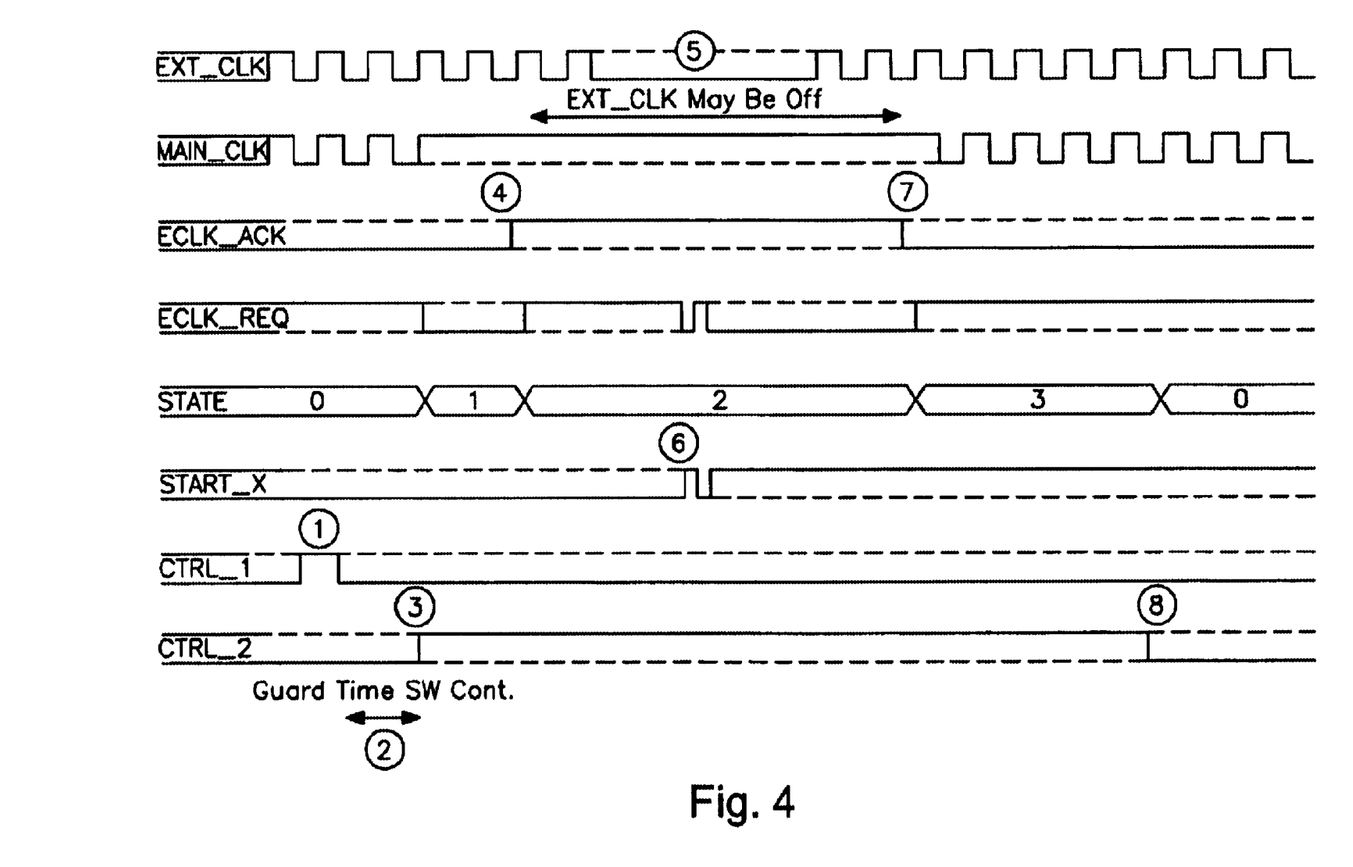
FIG. 4 shows a first timing diagram of the clock control block.

When processor A 10 determines that it may switch to a low power mode and stop the internal clock MAIN_CLK, it writes a one into the CTRL1 bit of its clock control register (event 1 in FIG. 4). In response, the pulse generator 205 creates a positive pulse at the enable input of the latches 201, 202, 203, and the current state of the clock start signals is stored in the latches. Processor A 10 then waits for a predetermined length of time, or guard time, (event 2) to ensure that no interrupts are pending. This delay is written into the software of processor A. If processor A receives an interrupt during this software guard time, the low power mode will be aborted by the software.

After this delay, processor A puts CTRL2 high by writing a one into the CTRL2 bit of its clock control register (event 3). On the next rising edge of the external clock ETX_CLK, this change in CTRL2 causes the state machine 104 to go into state 1. The first output x will go low, disabling the internal clock MAIN_CLK at a high level. The second output y likewise goes low so that the output of the AND gate 103 goes low regardless of the state of the clock start signals 12. The output ECLK_REQ of the OR-gate 102 will thus also be forced low. The low state of ECLK_REQ is recognised by processor B 20 as a request. In the present embodiment, the low state of this signal generates an interrupt in processor B 20. However, it will be understood that rather than treating this signal as an interrupt, processor B 20 may instead be organised to monitor the state of this connection at regular intervals. In acknowledgement of this interrupt, processor B 20 puts ECLK_ACK high (event 4). This causes the state machine 104 to go into state 2 on the next rising edge of the external clock EXT_CLK, and the second output y goes high. Providing no change of state of the clock start inputs has occurred, this will cause the clock request signal ECLK_REQ to go high.

Setting the y output high also effectively enables the AND-gate 103. Hence, any change of state in an unmasked clock start signal, which will force the output of the AND-gate 220 low, will also force ECLK_REQ low again, and so generate a second interrupt at processor B. Until this occurs ECLK_REQ remains high, and processor B can switch off the external clock EXT_CLK to processor A 10 (event 5). It should be noted that before switching off the external clock EXT_CLK to processor A 10, processor B 20 checks that the signal ECLK_REQ is set high after sending the acknowledgement (ECLK_ACK). The given logic states of these signals, i.e. both ECLK_REQ and ECLK_ACK high after the first interrupt, is a precondition for disabling transmission of the external clock EXT_CLK. The combined steps of setting ECLK_REQ first low and then high thus essentially constitutes a two-step request to disable the external clock EXT_CLK to processor A 10. If only one of these steps is completed, the request has no effect and the external clock will not be switched off. This is explained in more detail below with reference to FIG. 5.

At event 6 in FIG. 4, a clock start signal 12, denoted by START_X, toggles. In response, ECLK_REQ is forced low once again, and a second interrupt is generated in processor B 20. This second input serves as an external clock enable request. In response to this second interrupt, processor B 20 first switches on the external clock ETX_CLK and then sets ECLK_ACK low (event 7). On the following rising edge of the external clock ETX_CLK, the state machine goes into state 3. The first output x will go high so that both outputs are again high. The internal clock MAIN_CLK will once again be enabled, and processor A 10 can commence processing the task requiring synchronised operation that was signalled by one of the clock start inputs 12. Processor A 10 then also puts CTRL2 low (event 8) causing the state machine to go back to its default state 0, and terminating the procedure. It should be noted that the external clock need not be turned off at event 5. The signal states described above merely provide the conditions for suppressing the supply of the external clock, however the procedure for restarting the internal clock will be the same if the external clock is continuously supplied to processor A 10.

Figure 5:
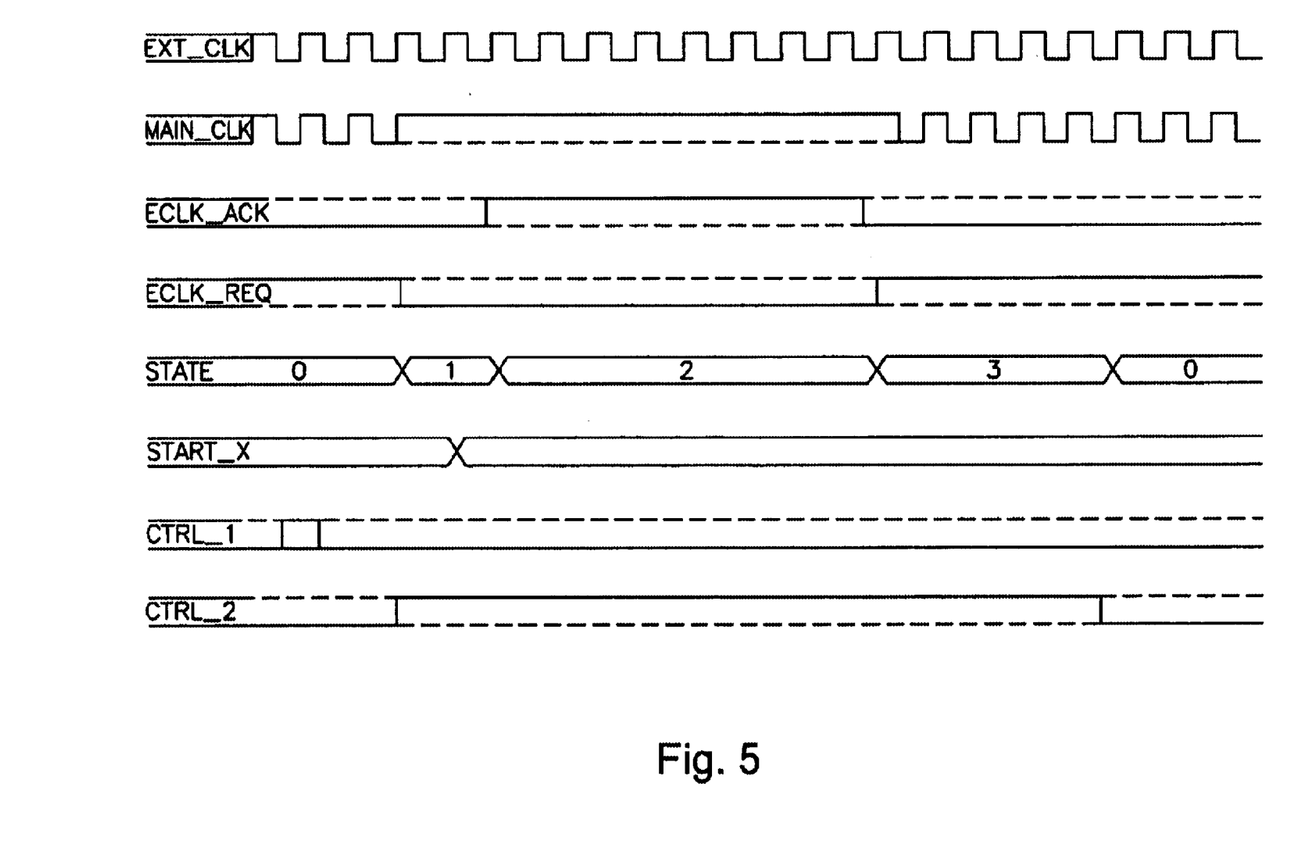
FIG. 5 shows a second timing diagram of the clock control block.

FIG. 5 shows the procedure when one or more of the clock start signals 12 toggles while the state machine is in state 1, that is, before processor B has finished servicing the interrupt by putting ECLK_ACK high. This results in ECLK_REQ remaining low when the state machine goes into state 2, because the output of the clock request module 200 is forced low by the toggled input or inputs. Processor B detects that ECLK_EQ remains low and resets ECLK_ACK to a low level, causing the state machine 104 to go into state 3, and the internal clock to restart. The procedure is thus aborted, preventing the external clock from being stopped. In the present embodiment, it is assumed that the delay between the signal ECLK_ACK being set high by processor B 20, and ECLK_EQ going high in normal operation as shown in event 4 of FIG. 4, is at the most one clock cycle. Since the time between operating two instructions will generally far exceed this delay, there is no need to incorporate a delay in the software of processor B 20. Processor B can therefore set ECLK_ACK low in one instruction and check the level of ECLK_REQ in the next. However it will be understood that a hardware implementation of the clock control in processor B 20, for example using a state machine, may need to incorporate some kind of delay before reacting to the low level of the signal ECLK_EQ.

If one or more of the clock start signals 12 toggles when the state machine 104 is in state 0, but after initiation of the low power mode by processor A 10, that is between events 1 and 3 in FIG. 4, the procedure will likewise be aborted. If processor A 10 detects the change in one of the clock start signals or is alerted of this change by an interrupt, CTLR2 will not be set high and the process will go no further. However, even if this change in state is not detected by processor A 10, for example, because the clock start signal 12 toggles immediately before CTRL2 is set high, the toggled input will force ELCK_REQ to remain low and the timing will be identical to that shown in FIG. 5.

As mentioned above, the control of the external clock need not be implemented by software in processor B. In particular, a hardware implementation incorporating some form of state machine able to distinguish between the different states invoked by setting the clock request signal ECLK_EQ low, by ECLK_REQ being subsequently set high, and by ECLK_EQ being reset low again could be utilised. Such an implementation enables the external clock supply to be controlled independently of processor B 20, for example, incorporated in a separate module communicating with the external clock source and several slave devices adapted to receive the clock.

In a further embodiment, the exchange of signals between processor A 10 and processor B 20 can be effected over a single line by providing a bi-directional terminal on each side. This, in effect, constitutes a single signal. While the implementation of such an embodiment would require modification of the state machine to allow the various sequence of states to be invoked using a single signal, the resulting arrangement would have distinct advantages, as it would free a further connection for both processors.

The above described arrangement allows all clock start signals, which indicate that some form of synchronised activity must be performed, to be received only by the processor intended to process these signals. Accordingly, the only communication between a slave processor and the master processor, or other circuitry that providing the clock signal, can be effected via a single or, at most, two connections. Furthermore, at any time prior to stopping the external clock, the procedure will be aborted with the minimum delay if a clock start signal 12 toggles, indicating that synchronised operation of processor A is required.

The suppression and generation of the internal clock MAIN_CLK in processor A is synchronised with the external clock signal ETX_CLK so that a clean and reliable signal will be generated. Moreover the internal clock will be stopped in a predetermined state. While in the above example the internal clock is arrested in a high state, it will be understood that appropriated modifications may be made to cause it to stop in a low state if this is advantageous for the application.

It will be understood that the various combinations of logic circuits described with reference to the preferred embodiment may be replaced by different logic circuit combinations having the same effect.

What is claimed is:

1. A clock control arrangement for a device adapted to receive a clock signal from an external source, said device comprising means adapted to receive at least one input signal indicative of an event requiring synchronized operation of said device, said arrangement including
   switching means having an input adapted to receive a said clock signal from said external source to said device and arranged to generate an internal clock signal at an output,
   clock signal generating means having an output adapted to be coupled to means controlling said external clock, and
   control means responsive to at least one control signal and being adapted to control the switching means and said clock signal generating means in accordance with a predetermined logic state of said at least one control signal.

2. An arrangement as claimed in claim 1, wherein said control means are arranged to control said clock signal generating means to generate an external clock disable request for controlling said external clock in accordance with at least one predetermined logic state of said at least one control signal.

3. An arrangement as claimed in claim 1, wherein said control means are responsive to a first control signal generated by said device and a second control signal generated by the external clock controller, said control means adapted to control the switching means and the clock signal generating means in accordance with predetermined combined logic states of said first and second control signals.

4. Arrangement as claimed in claim 1, wherein said clock signal generating means are coupled to a clock start module adapted to receive said at least one input signal.

5. An arrangement as claimed in claim 4, wherein said clock start module is arranged to generate a clock request signal through said clock signal generating means in response to a change of state of said at least one input signal.

6. An arrangement as claimed in claim 4, wherein said clock start module includes means for storing the state of the at least one input signal and means for comparing a current state of the at least one input signal with the stored state.

7. An arrangement as claimed in claim 6, wherein the storage means include at least one latch adapted to store the current state of at least one input signal in response to a third control signal.

8. An arrangement as claimed in claim 6, wherein an output of each of said comparing means are combined in a logic circuit.

9. An arrangement as claimed in claim 6, wherein means are provided for selectively masking the output of said comparing means.

10. An arrangement as claimed in claim 9, wherein said masking means includes a mask register and at least one logic circuit.

11. An arrangement as claimed in claim 1, wherein said control means are clocked by said external clock.

12. An arrangement as claimed in claim 2, wherein said control means are adapted to disable said switching means and to control said clock signal generating means to generate an external clock disable signal in response to a change of state of a first of the at least one control signal and to control said clock signal generating means to enable said clock control module in response to a change of state of a second of the at least one control signal.

13. An apparatus comprising:
   a master device adapted to provide a clock signal to a slave device, wherein said slave device includes a clock control arrangement for a device adapted to receive a clock signal from an external source, said device comprising means adapted to receive at least one input signal indicative of an event requiring synchronized operation of said device, said arrangement including
   switching means having an input adapted to receive a said clock signal from said external source to said device and arranged to generate an internal clock signal at an output,
   clock signal generating means having an output adapted to be coupled to means controlling said external clock, and
   control means responsive to at least one control signal and being adapted to control the switching means and said clock signal generating means in accordance with a predetermined logic state of said at least one control signal.

14. A method of controlling a clock in a device adapted to receive an external clock from an external clock source and to generate an internal clock from said external clock, the method including the steps of:
   disabling the internal clock and generating a request for an external clock controller, to disable the external clock, and
   suppressing said external clock disable request in response a change of state of at least one input to the device adapted to carry signals indicative of an event requiring synchronized operation of the device.

15. A method as claimed in claim 14, wherein said external clock disable request is composed of at least two parts, wherein at least one part of said request is suppressed in response to a change of state of the at least one input to the device.

16. A method as claimed in claim 14, wherein the steps of disabling the internal clock and generating said external clock disable request are synchronized with said external clock.

17. A method as claimed in claim 14, further comprising generating an external clock enable request in response to a change of state of said at least one input and enabling said internal clock in response to an acknowledgment from said external clock controller.

18. A method as claimed in claim 17, wherein the step of enabling the internal clock is synchronized with said external clock.

19. A method as claimed in claim 14, further comprising storing a current state of said at least one input before disabling said internal clock.

20. A method as claimed in claim 19, further comprising determining a change of state of said at least one input by comparing a current state of said input with the stored state.

21. A method of controlling a clock supplied to a device by an external source, including
   inhibiting internal clock generation from an external clock in said device, generating a request to disable the supply of the external clock to said device, acknowledging the request, and
   disabling said external clock, wherein the disabling of the external clock is suppressed if the device receives at least one signal indicative of an event requiring clocked operation of the device.

22. A method as claimed in claim 21, further comprising requesting the supply of the external clock, acknowledging the request, restarting the supply of the external clock to the device, and re-enabling the generation of the internal clock.

23. A method as claimed in claim 22, wherein inhibiting and re-enabling of the internal clock generation are synchronized by said external clock.

* * * * *

UNITED STATES PATENT AND TRADEMARK OFFICE
CERTIFICATE OF CORRECTION

PATENT NO. : 6,674,821 B1
DATED : January 6, 2004
INVENTOR(S) : Sven Mejyr

It is certified that error appears in the above-identified patent and that said Letters Patent is hereby corrected as shown below:

Column 2,
Line 56, delete "OF THE DRAWINGS"

Column 6,
Line 32, replace "EQ" with -- REQ --

Column 7,
Line 9, after "receive" delete "a"

Column 8,
Line 6, after "receive" delete "a"

Column 18,
Line 22, after "controller" delete ",".

Signed and Sealed this

Twentieth Day of April, 2004

JON W. DUDAS
*Acting Director of the United States Patent and Trademark Office*